(12) United States Patent
Wood

(10) Patent No.: US 7,003,203 B2
(45) Date of Patent: Feb. 21, 2006

(54) LARGE EFFECTIVE AREA, LOW KAPPA, DISPERSION COMPENSATING OPTICAL FIBER AND TELECOMMUNICATION SPAN INCLUDING SAME

(75) Inventor: William A. Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 80 days.

(21) Appl. No.: 10/622,886

(22) Filed: Jul. 18, 2003

(65) Prior Publication Data

US 2005/0013571 A1    Jan. 20, 2005

(51) Int. Cl.
G02B 6/02       (2006.01)
G02B 6/18       (2006.01)
G02B 6/22       (2006.01)

(52) U.S. Cl. .................. 385/124; 385/123; 385/126; 385/127

(58) Field of Classification Search ......... 385/123–128
See application file for complete search history.

(56) References Cited

U.S. PATENT DOCUMENTS

| | | | |
|---|---|---|---|
| 4,715,679 A | 12/1987 | Bhagavatula | 350/96.33 |
| 4,877,304 A | 10/1989 | Bhagavatula | 350/96.29 |
| 5,013,131 A * | 5/1991 | Fotheringham | 385/124 |
| 5,361,319 A | 11/1994 | Antos et al. | 385/123 |
| 5,483,612 A | 1/1996 | Gallagher et al. | 385/127 |
| 5,684,909 A | 11/1997 | Liu | 385/127 |
| 5,781,684 A | 7/1998 | Liu | 385/124 |
| 5,835,655 A | 11/1998 | Liu et al. | 385/124 |
| 5,999,679 A | 12/1999 | Antos et al. | 385/127 |
| 6,031,956 A * | 2/2000 | Li et al. | 385/124 |
| 6,134,367 A | 10/2000 | Jones et al. | 385/124 |
| 6,317,552 B1 * | 11/2001 | Berkey | 385/127 |
| 6,343,176 B1 * | 1/2002 | Li et al. | 385/127 |
| 6,360,045 B1 * | 3/2002 | Shoval et al. | 385/123 |
| 6,424,778 B1 | 7/2002 | Li | 385/127 |
| 6,430,346 B1 | 8/2002 | Conradi et al. | 385/123 |
| 6,430,347 B1 | 8/2002 | Cain et al. | 385/123 |
| 6,445,864 B1 | 9/2002 | Jiang et al. | 385/127 |
| 6,640,031 B1 * | 10/2003 | Dong et al. | 385/39 |
| 6,789,960 B1 * | 9/2004 | Bickham et al. | 385/96 |
| 6,801,699 B1 * | 10/2004 | Bickham et al. | 385/123 |
| 2002/0012510 A1 * | 1/2002 | Jiang et al. | 385/123 |
| 2002/0015569 A1 * | 2/2002 | Vobian | 385/123 |
| 2002/0021877 A1 * | 2/2002 | Kyogoku et al. | 385/124 |
| 2002/0154877 A1 * | 10/2002 | Li et al. | 385/127 |

(Continued)

FOREIGN PATENT DOCUMENTS

EP        0798578        10/1997

(Continued)

Primary Examiner—Frank G. Font
Assistant Examiner—Ryan Lepisto
(74) Attorney, Agent, or Firm—Randall S. Wayland

(57) ABSTRACT

A dispersion compensating optical fiber for use in a high data rate telecommunications span or link. The dispersion compensating optical fiber in accordance with the invention provides excellent compensation of total dispersion over a range of wavelengths (e.g., 1527–1567 nm), thus minimizing signal distortion in wavelength division multiplexed systems. The dispersion compensating fiber has a refractive index profile with a central core segment having an inner peak with $\Delta_i\%$, an outer peak with $\Delta_1\%$, and a trough with a $\Delta_t\%$ less than both $\Delta_i\%$ and $\Delta_1\%$, a moat segment with a $\Delta_2\%$, and a ring segment with a $\Delta_3\%$. Preferably, $\Delta_t\%$ and $\Delta_3\%$ are greater than $\Delta_2\%$. Also disclosed is an optical transmission span having residual dispersion less than +/−25 ps/km for 100 km of transmission fiber over a wavelength band of 1527–1567 nm.

19 Claims, 8 Drawing Sheets

U.S. PATENT DOCUMENTS

| | | | |
|---|---|---|---|
| 2003/0021563 A1 * | 1/2003 | Jiang et al. | 385/123 |
| 2003/0063875 A1 * | 4/2003 | Bickham et al. | 385/98 |
| 2003/0147612 A1 * | 8/2003 | Jiang et al. | 385/127 |
| 2003/0174981 A1 | 9/2003 | DiGiovanni et al. | 385/123 |
| 2003/0210876 A1 * | 11/2003 | Gaarde et al. | 385/123 |
| 2004/0052486 A1 * | 3/2004 | Gaarde et al. | 385/127 |

FOREIGN PATENT DOCUMENTS

| | | |
|---|---|---|
| WO | WO 00/67053 | 11/2000 |
| WO | WO 01/71391 | 9/2001 |
| WO | WO 01/73486 | 10/2001 |
| WO | WO 02/069005 | 9/2002 |

* cited by examiner

Fig. 7
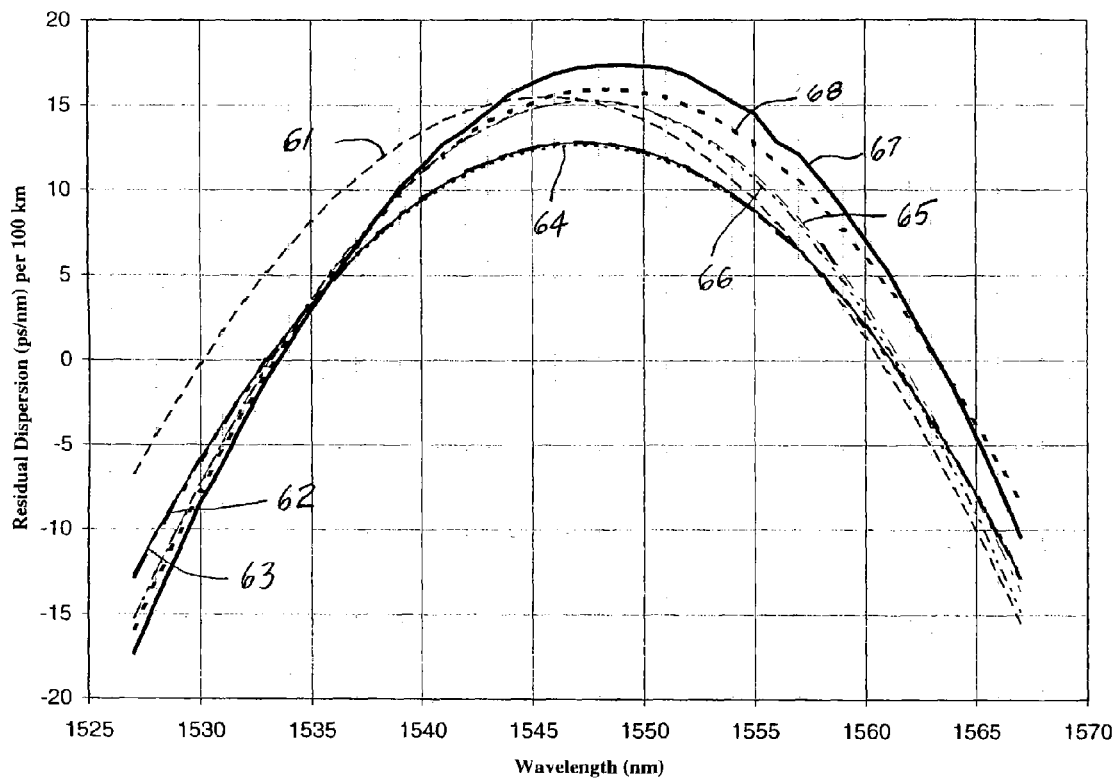
Example 1 Fig. 8
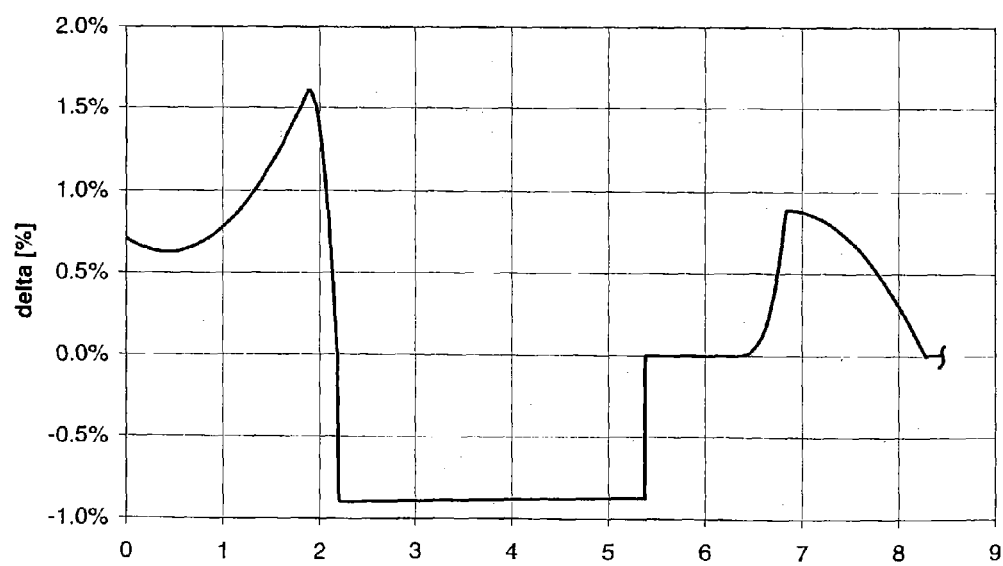

LARGE EFFECTIVE AREA, LOW KAPPA, DISPERSION COMPENSATING OPTICAL FIBER AND TELECOMMUNICATION SPAN INCLUDING SAME

BACKGROUND OF THE INVENTION

1. Field of the Invention

The present invention relates generally to an optical fiber designed to compensate for chromatic dispersion, and more particularly to a dispersion compensating optical fiber designed to provide superior compensation over a specified wavelength band.

2. Technical Background

Dispersion compensation techniques in telecommunications systems or spans have been used successfully. One useful dispersion compensation technique is where the total dispersion (also called chromatic dispersion) of a transmission span is compensated for by an appropriately designed (generally having a negative dispersion at 1550 nm) dispersion compensation optical fiber (a so-called dispersion compensating fiber). The dispersion compensating fiber is generally wound onto a spool and is housed in a dispersion compensation module. The dispersion compensating module is inserted into the transmission span at an access point, such as at the end of the span to compensate for the accumulated dispersion of the span.

Another dispersion compensation scheme involves the use of both positive and negative dispersion fibers in the cables of the span (a so-called dispersion managed cable). Each cable may contain both positive and negative total dispersion waveguide fibers, or the span can be formed using cables having only positive dispersion together with cables having only negative dispersion.

In yet another dispersion compensation technique, the dispersion compensating fiber exhibits a total dispersion and a total dispersion slope, both of which effectively mirror that of the transmission fiber. That is, the ratio of total dispersion to the total dispersion slope, referred to as kappa, is identical (or near identical) for the transmission fiber and the dispersion compensating fiber. Matching kappas of the two fibers helps improve compensation across the desired wavelength band.

Optical transmissions systems are currently designed with the goal of providing residual dispersion across a representative span that is very low within an operating wavelength band. However, new dispersion compensating fiber designs are continuously being sought after that can further reduce residual dispersion (defined herein as one half of the difference between the maximum and minimum dispersion across the wavelength band of interest for a 100 km length of transmission fiber being compensated).

There is, therefore, a need for a dispersion compensating fiber that provides low residual dispersion in systems operating over a specified wavelength band, and in particular, a need for dispersion compensating fibers that exhibit a low kappa and large effective area.

SUMMARY OF THE INVENTION

The following definitions are in accordance with common usage in the art.

Refractive index profile—Relationship between refractive index or relative refractive index and optical fiber waveguide radius.

Segmented core—A core that is divided into at least a first and a second waveguide fiber core portion or segment, but which may include more than two segments, such as a central core, a moat, and a ring. Each portion or segment is located along a particular radial length dimension, is substantially symmetric about the waveguide fiber's centerline, and has an associated refractive index profile.

Radii—Radii of the segments of the core are defined in terms of the respective refractive indexes at respective beginning and end points of the segments. The radii are measured from the fiber's centerline to the intersection of the end of a segment with a hypothetical line having the same index of refraction as the cladding (the so-called zero crossing line). Further definitions of the radii used herein are set forth in the figures.

Total dispersion—(Sometimes called chromatic dispersion) Sum of the material dispersion, waveguide dispersion, and the inter-modal dispersion. In the case of single mode waveguide fibers, the inter-modal dispersion is zero. The sign convention generally applied to the total dispersion is as follows: total dispersion is said to be positive if shorter wavelength signals travel faster than longer wavelength signals in the waveguide. Conversely, in a negative total dispersion waveguide, signals of longer wavelength travel faster.

Effective Area—The effective area is given by the equation:

$$A_{eff} = 2\pi (\int E^2 \, r \, dr)^2 / (\int E^4 \, r \, dr),$$

where the integration limits are 0 to $\infty$, E is the electric field associated with light propagated in the waveguide, and r is the fiber's radius.

Relative refractive index percent ($\Delta\%$)—The relative refractive index percent ($\Delta\%$) as used herein is given by the equation:

$$\Delta\% = 100 \times (n_i^2 - n_c^2)/2n_c^2,$$

where $n_i$ is the maximum refractive index in the region i, unless otherwise specified, and $n_c$ is the average refractive index of the cladding region. In those cases in which the refractive index of a specified segment is less than the average refractive index of the cladding region, the relative index percent is negative and is calculated at the point at which the relative index is most negative unless otherwise specified.

$\alpha$-profile—The term $\alpha$-profile refers to a refractive index profile, expressed in terms of $\Delta(b)\%$, where b is radius, which follows the equation:

$$\Delta(b)\% = \Delta(b_o)(1 - [|b - b_o|/(b_1 - b_o)]^\alpha),$$

where $b_o$ is the point at which $\Delta(b)\%$ is maximum, $b_1$ is the point at which $\Delta(b)\%$ is zero, and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number which generally defines the shape of the $\alpha$-profile.

Kappa—The total dispersion divided by total dispersion slope.

Optical fiber telecommunications link or span—A waveguide optical fiber telecommunications link or telecommunications span (or simply a link or span) is made up of a length of optical waveguide fiber having respective ends adapted to be optically coupled to a transmitter and receiver such that light signals may be propagated therebetween. The length of optical waveguide fiber is generally made up of a plurality of shorter lengths that are spliced or connected together in end to end series arrangement. A span or link may include additional conventional optical components such as optical amplifiers, optical attenuators, optical switches, optical filters, or multiplexing or demultiplexing devices and/or other conventional devices. A group of inter-connected links or spans is a telecommunications system.

Pin array bend test—The pin array bend test is used to compare relative resistance of waveguide fibers to bending applied thereto. To perform this test, attenuation at a specified wavelength of 1550 nm is measured for a waveguide fiber with essentially no induced bending loss. The waveguide fiber is then woven about an array of pins (the pin array) and attenuation again measured at 1550 nm. The loss induced by bending, typically expressed in units of dB, is the difference between the two attenuation measurements. The pin array test as defined herein has a set of ten cylindrical pins arranged in a single row and held in a fixed vertical position on a flat surface. The pin spacing is 5 mm, center to center, and the pin diameter is 0.67 mm. The waveguide fiber is caused to pass on opposite sides of adjacent pins. During testing, the waveguide fiber is placed under a tension just sufficient to make the waveguide conform to a portion of the periphery of the pins. The test provides a measure of the macro-bend resistance of the waveguide optical fiber.

Lateral load test—Another bend test referenced herein is the lateral load test. In this test, a prescribed length of waveguide optical fiber is placed between two flat plates. A #70 wire mesh is attached to one of the plates. A known length of waveguide fiber is sandwiched between the plates and in contact with the mesh and a reference attenuation is measured while the plates are pressed together with a force of 30 newtons. A 70 newton force is then applied to the plates and the increase in attenuation, typically express in units of dB/m, is measured. This increase in attenuation is a measure of the lateral load attenuation of the waveguide.

In accordance with embodiments of the present invention, a dispersion compensating optical fiber is provided with a refractive index profile having a central core segment with an inner and outer peak and a trough positioned between the inner and outer peaks. This dispersion compensating fiber advantageously may achieve both relatively low kappa and relatively high effective area. The inner peak preferably has a relative refractive index, $\Delta_i\%$; the outer peak preferably has a relative refractive index, $\Delta_1\%$; and the trough preferably has a minimum relative refractive index, $\Delta_t\%$, less than both $\Delta_i\%$ and $\Delta_1\%$. The dispersion compensating fiber preferably also has a moat segment, surrounding the central core segment, having a relative refractive index, $\Delta_2\%$, and a ring segment, surrounding the moat segment, having a positive relative refractive index, $\Delta_3\%$. Preferably, $\Delta_i\%$ and $\Delta_3\%$ are greater than $\Delta_2\%$. Preferably also, the inner peak is located at a radial radius $r_i$ of between about 0.0 $\mu$m and 1.0 $\mu$m. The outer peak is preferably located at a radial radius $r_o$ between about 1.5 $\mu$m and 2.5 $\mu$m.

Preferably, the refractive index profile of the dispersion compensating fiber is selected to provide a negative total dispersion at 1550 nm; more preferably a total dispersion between about −50 and −100 ps/nm/km. Further, preferably the refractive index profile of the dispersion compensating fiber is selected to provide a negative total dispersion slope at 1550 nm; more preferably a total dispersion slope of between −1.0 and −2.5 ps/nm²/km. According to further embodiments of the invention, the dispersion compensating fiber preferably has a kappa, defined as a ratio of total dispersion to total dispersion slope at 1550 nm, of less than 100 nm; more preferably of between about 35 nm to 65 nm at 1550 nm.

In a preferred embodiment of the invention, the minimum trough relative refractive index, $\Delta_t\%$, of the dispersion compensating fiber is positive; $\Delta_t\%$ being most preferably between about 0.3% and 1.0%. Further, the relative refractive index, $\Delta_2\%$, of the moat segment is preferably negative; more preferably less than −0.5%; and most preferably in the range from −0.5% to −1.0%. The relative refractive index, $\Delta_3\%$, of the ring segment is preferably also positive; more preferably greater than 0.4%; and most preferably between about 0.5% and 1.0%.

In accordance with further embodiments of the invention, an optical fiber communications span is provided comprising a transmission fiber operating in a wavelength band having a center operating wavelength, and the dispersion compensating fiber in accordance with any of the embodiments of the invention optically coupled to the transmission fiber, wherein a wavelength corresponding to the maximum negative dispersion (a so-called dispersion minima) of the dispersion compensating fiber is located at least 50 nm above the center operating wavelength. Preferably, the optical fiber communications span exhibits a residual dispersion less than +/−20 ps/nm per 100 km of transmission fiber over a wavelength band of between 1527 to 1567 nm.

In accordance with further embodiments of the invention, an optical fiber communications span is provided comprising a transmission fiber operating in a wavelength band having a center operating wavelength, and a dispersion compensating fiber in accordance with any of the embodiments of the invention optically coupled to the transmission fiber wherein residual dispersion of the span is less than +/−20 ps/nm per 100 km of transmission fiber over a wavelength band of between 1527 to 1567 nm.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 7 is a plot of residual dispersion vs. wavelength for optical fiber communication spans including embodiments of the dispersion compensating fiber in accordance with the present invention.

FIGS. 8–16 are a plots of a refractive index profile of other embodiment of the dispersion compensating fiber in accordance with the present invention.

DETAILED DESCRIPTION OF THE PREFERRED EMBODIMENTS

Figure 1:
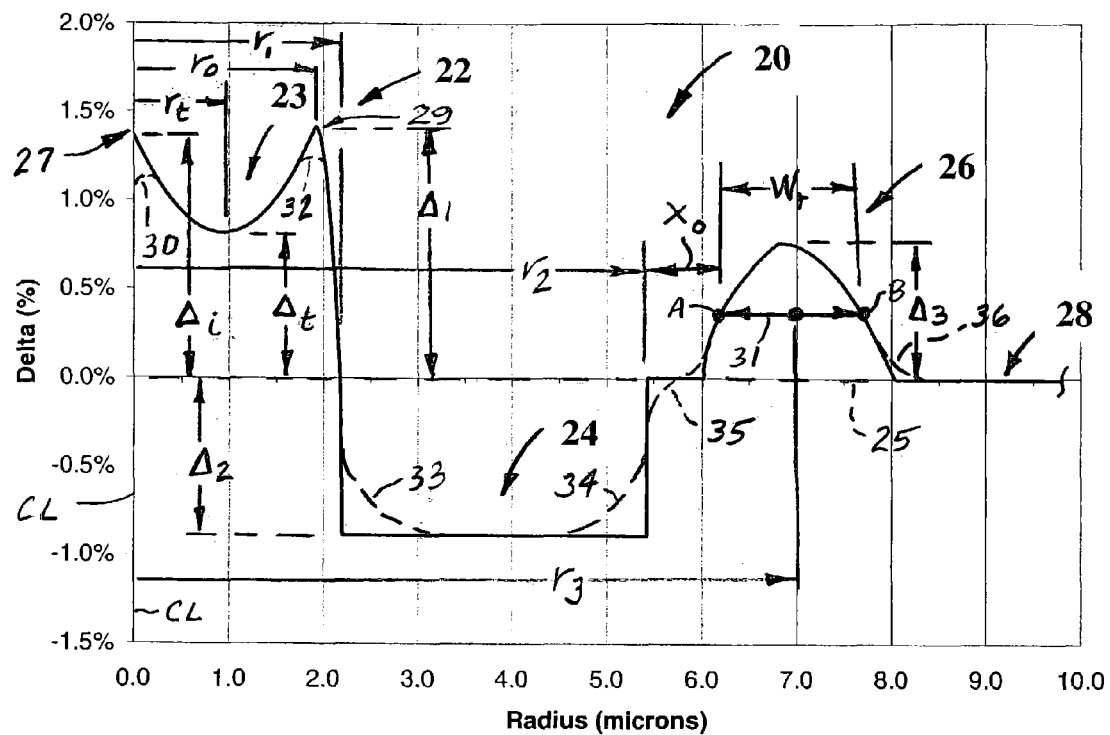
FIG. 1 is a plot of a refractive index profile of the dispersion compensating fiber in accordance with embodiments of the present invention.
Figure 2:
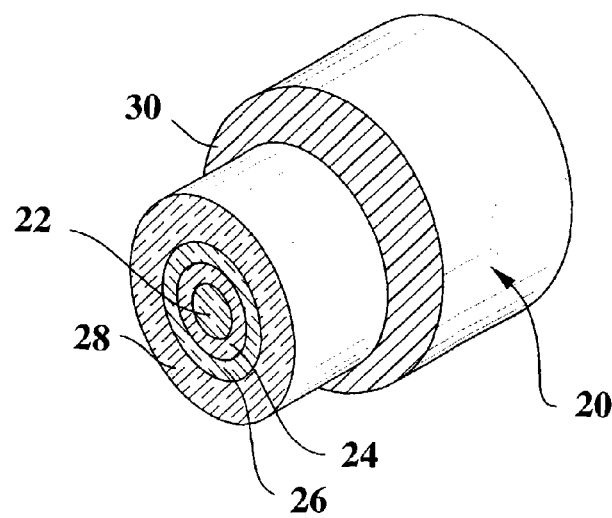
FIG. 2 is a partial isometric view of the dispersion compensating fiber in accordance with embodiments of the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 3:
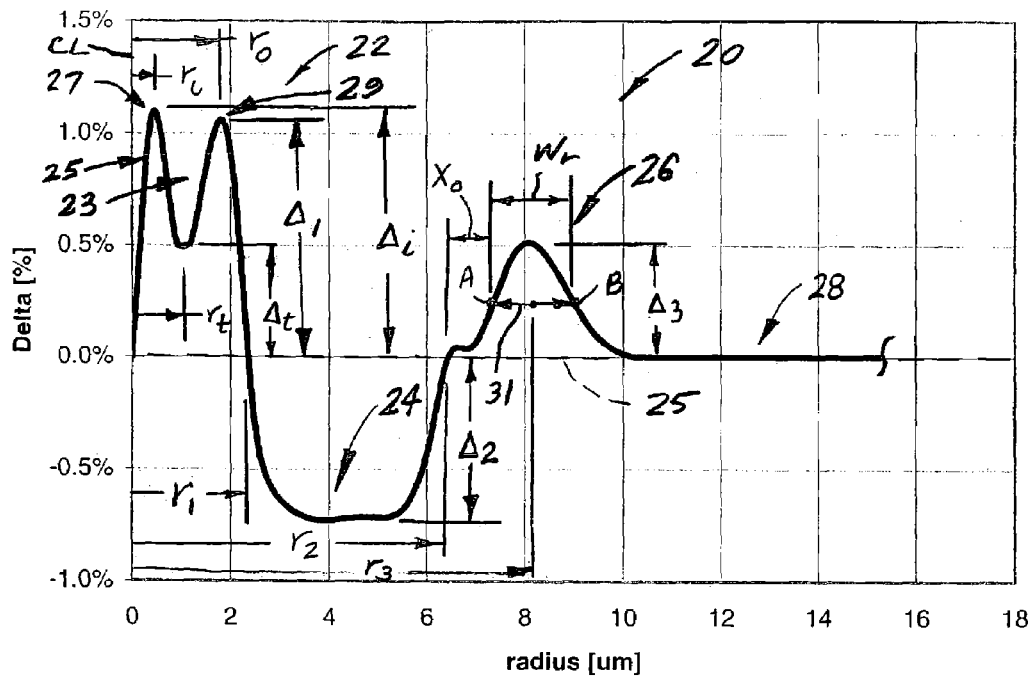
FIG. 3 is a plot of a refractive index profile of another embodiment of the dispersion compensating fiber in accordance with the present invention.

Several exemplary embodiments of the dispersion compensating fiber 20 in accordance with the invention are shown in FIG. 1 and FIG. 3. These figures plot the refractive index profile of the multi-segmented core dispersion compensating fiber illustrating delta percentage, Delta [%] (otherwise referred to as $\Delta(\%)$ herein), plotted against the fiber radius in $\mu$m. FIGS. 8–16 illustrate refractive index profiles of other embodiments of the dispersion compensating fiber in accordance with the invention.

The dispersion compensating fibers 20 in accordance with the various embodiments of the invention described herein include a central core segment 22 including an inner peak 27 with a relative refractive index, $\Delta_i\%$, preferably located at a radius $r_i$ of between 0.0 $\mu$m and 1.0 $\mu$m (the radius $r_i$ is 0.0 $\mu$m in FIG. 1), and in some embodiments between 0.25 and 0.75 $\mu$m, an outer peak 29 with a relative refractive index, $\Delta_1\%$, preferably located at a radius, $r_o$, between 1.5 $\mu$m and 2.5 $\mu$m, and a trough 23 positioned between the inner peak 27 and outer peak 29 at a radius, $r_t$, having a minimum relative refractive index $\Delta_t\%$ less than both $\Delta_i\%$ and $\Delta_1\%$. The radius, $r_i$, for example, is measured from the profile centerline, CL, to the point of maximum refractive index of the inner peak 27. The radius, $r_o$, for example, is measured from the profile centerline, CL, to the point of maximum refractive index of the outer peak 29. The radius, $r_1$, for example, is measured from the profile centerline, CL, to the point at which the central core segment 22 profile crosses the projected horizontal line 25 defined by $\Delta\%=0.0$. The horizontal line 25 defined by $\Delta\%=0.0$ corresponds to the cladding 28 which is preferably pure silica. All other radii discussed herein are also measured relative to the profile centerline, CL.

Dispersion compensating fibers in accordance with the invention preferably also include an annular moat segment 24 which is preferably fluorine doped, such that it exhibits a negative relative refractive index, $\Delta_2\%$. A radial outermost edge of the moat segment 24 is defined by an outer radius, $r_2$, measured to the point at which the ascending leg of moat segment 24 meets the zero line 25. The dispersion compensating fibers 20 preferably also include an annular ring segment 26, which is preferably germania doped such that the fibers exhibit a positive relative refractive index, $\Delta_3\%$. The radial location of ring segment 26 is defined by radius, $r_3$, measured to the approximate center thereof. In particular, $r_3$ is measured to a point which bisects a line 31 connecting the two half height points A, B on the ring segment 26. The half height points A, B are defined as the points on the profile positioned at ½ the value of $\Delta_3\%$. A half width of the ring segment 26 is given by $W_r$ and is defined as the radial distance between the two half height points A, B on the ascending and descending legs of the ring segment 26. The so-called offset of the ring segment 26 from the edge of the moat segment 24 is quantified and defined by the dimension $X_o$. $X_o$ is defined as the distance between the outer edge of the moat segment 24 (at $r_2$) and the half height point A. The definitions of radii $r_i$, $r_t$, $r_o$, $r_1$, $r_2$, $r_3$, offset $X_o$, and half width $W_r$ will be used for each of the refractive index profiles disclosed and described herein and will not be repeated in the description herein. The dispersion compensating fibers described herein also include a cladding 28 which abuts and surrounds the ring segment 26. The cladding 28 is preferably substantially pure silica as described above, but may alternatively include amounts of other dopants. Although shown truncated, the cladding extends the outside of the fiber, preferably at a diameter of about 125 microns. Surrounding the cladding is a fiber coating (not shown for clarity). Generally, such coatings include a primary and secondary polymer coatings of differing modulus of elasticity as are known to persons of ordinary skill in the art.

Segmented core refractive index profile charted in FIG. 3 has a central segment 22, a moat segment 24, and a ring segment 26 similar to the profile depicted in FIG. 1. However, the rounding which is evident at the juncture of segments 24 and 26 and at the minimum point of segment 24 is due to dopant diffusion which occurs at relatively abrupt changes in relative refractive index, i.e., relatively abrupt changes in dopant concentration. Additionally, the central core segment 22 of the FIG. 3 embodiment includes a centerline depression 25 that causes the inner radius, $r_i$, to be nonzero. In particular, the radius, $r_i$, in this embodiment is preferably located between 0.25 and 0.75 $\mu$m from the CL.

The embodiment of dispersion compensating fiber shown in FIG. 1 is similar to that of FIG. 3 except that the transitions between the segments are sharper in FIG. 1. It should be recognized that such sharp transitions, although desirable, are difficult to achieve due to processing limitations and, thus, the alternate dotted relative refractive index configurations (illustrated by dotted line 30, 32–36) are more readily achievable.

According to the invention, the respective refractive index profiles of the dispersion compensating fibers 20 shown in FIGS. 1, 3 and 8–16 have preferred structural parameters taken from the following ranges:

relative refractive index, $\Delta_i\%$, of the inner peak 27 of the central core segment 22, is preferably in the range from 0.5% to 2.0%, and in certain embodiments between 0.7% and 1.8%, and radius, $r_i$, is preferably in the range from 0.0 $\mu$m to 0.85 $\mu$m, and in certain embodiments between 0.25 and 0.75 $\mu$m;

relative refractive index, $\Delta_1\%$, of the outer peak 29 of the central core segment 22, is preferably in the range from 0.9% to 2.0%; and in certain embodiments between 0.9% and 1.7%, and radius, $r_o$, is preferably in the range from 1.4 $\mu$m to 2.4 $\mu$m, and in certain embodiments between 1.5 and 2.25 $\mu$m;

minimum relative refractive index, $\Delta_t\%$, of the trough 23 of the central core segment 22 that is preferably positive, less than both $\Delta_i\%$ and $\Delta_1\%$, and preferably in the range from 0.3% to 1.0%, and in some embodiments from 0.4% to 1.0%, and radius $r_t$ in the range from 0.5 $\mu$m to 1.5 $\mu$m;

relative refractive index, $\Delta_2\%$, of the moat segment 24 which is preferably negative, preferably more negative than −0.5%, more preferably in the range from −0.5% to −1.0%, and preferably has an outer radius, $r_2$, in the range from about 4.0 μm to 8.0 μm;

relative refractive index, $\Delta_3\%$, of the ring segment 26 which is preferably positive, preferably greater than 0.4%, more preferably in the range from 0.5% to 1.0%, and having a center radius, $r_3$ in the preferable range from 5.0 μm to 9.0 μm; and index, $\Delta_3\%$, and index, $\Delta_t\%$, are preferably greater than index $\Delta_2\%$.

Profiles of the dispersion compensating fiber 20 in accordance with the invention where modeled based upon the relative refractive index percent versus radius shown in FIGS. 1, 3 and 8–16. The structural parameters of each of the profiles as well as the predicted (calculated) fiber attributes are set forth in Tables 1 and 3 below.

The refractive index profiles of the family of dispersion compensating fibers in accordance with the present invention are selected to provide total dispersion values that are negative at 1550 nm; and more preferably between −50 ps/nm/km and −100 ps/nm/km at 1550 nm. Preferably also, the refractive index profiles of the family of dispersion compensating fibers are selected to provide total dispersion slope values that are negative at 1550 nm; and more preferably between −1.0 ps/nm²/km and −2.5 ps/nm²/km at 1550 nm. Kappa of the family of dispersion compensating fibers 20, defined as the ratio of total dispersion to total dispersion slope at 1550 nm, are designed to match well with the kappa values of certain high performance transmission fibers, for example, which have a kappa value less than 100 nm; more preferably in the range from 35 nm to 65 nm. Comparing the

TABLE 1

Dispersion Compensating Fiber Examples

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Ref. Numeral | 61 | 62 | 63 | 64 | 65 | 66 | 67 | 68 |
| FIG. # | FIG. 8 | FIG. 9 | FIG. 10 | FIG. 1 | FIG. 3 | FIG. 11 | FIG. 12 | FIG. 13 |
| $\Delta_i\%$ | 0.71 | 1.01 | 1.76 | 1.37 | 1.10 | 1.09 | 1.10 | 1.40 |
| $\Delta_t\%$ | 0.63 | 0.83 | 0.74 | 0.82 | 0.50 | 0.37 | 0.60 | 0.33 |
| $\Delta_1\%$ | 1.61 | 1.13 | 1.63 | 1.41 | 1.06 | 0.98 | 1.06 | 1.03 |
| $\Delta_2\%$ (Min) | −0.90 | −0.82 | −0.87 | −0.89 | −0.73 | −0.73 | −0.73 | −0.73 |
| $\Delta_3\%$ | 0.89 | 0.76 | 0.79 | 0.76 | 0.51 | 0.51 | 0.51 | 0.51 |
| $r_i$ (μm) | 0.00 | 0.00 | 0.00 | 0.00 | 0.45 | 0.62 | 0.45 | 0.25 |
| $r_t$ (μm) | 0.42 | 0.86 | 0.96 | 0.94 | 1.05 | 1.14 | 1.06 | 1.09 |
| $r_o$ (μm) | 1.89 | 2.23 | 1.84 | 1.92 | 1.81 | 1.58 | 1.80 | 1.77 |
| $r_1$ (μm) | 2.19 | 2.24 | 2.14 | 2.18 | 2.35 | 2.44 | 2.34 | 2.52 |
| $r_2$ (μm) | 5.38 | 5.68 | 5.40 | 5.43 | 6.44 | 6.52 | 6.41 | 6.60 |
| $r_3$ (μm) | 6.41 | 6.93 | 6.31 | 6.35 | 8.19 | 8.33 | 8.16 | 8.47 |
| $W_t$ (μm) | 1.11 | 1.18 | 1.43 | 1.46 | 1.59 | 1.66 | 1.59 | 1.71 |
| Xo (μm) | 0.47 | 0.66 | 0.19 | 0.19 | 0.95 | 0.98 | 0.95 | 1.01 |
| Dispersion (ps/nm/km) @ 1550 nm | −75.4 | −77.5 | −75.9 | −75.9 | −73.2 | −75.8 | −58.9 | −81.9 |
| Dispersion Slope ps/nm²/km @ 1550 nm | −1.31 | −1.30 | −1.27 | −1.27 | −1.58 | −1.63 | −1.25 | −1.73 |
| Kappa (nm) @ 1550 nm | 57.5 | 59.4 | 59.7 | 59.6 | 46.2 | 46.5 | 47.3 | 47.3 |
| Dispersion Minimum Location (nm) | 1640 | 1640 | 1642 | 1641 | 1621 | 1621 | 1634 | 1616 |
| Dispersion Minimum ps/nm/km | −195 | −194 | −200 | −199 | −202 | −201 | −201 | −196 |
| Aeff (μm²) @ 1550 nm | 23.7 | 23.7 | 21.7 | 22.1 | 27.5 | 27.3 | 25.7 | 28.5 |
| MFD (μm) @ 1550 nm | 4.98 | 5.13 | 4.88 | 4.92 | 5.64 | 5.60 | 5.52 | 5.72 |
| Pin Array (dB) @ 1550 nm | 14 | 38 | 12 | 17 | 86 | 74 | 68 | 71 |
| Lateral Load Bend Loss (dB) @ 1550 nm | 0.09 | 0.09 | 0.08 | 0.09 | 0.12 | 0.11 | 0.08 | 0.13 |
| Cutoff (nm) Straight Fiber | 1980 | 1870 | 1950 | 1900 | 1930 | 1980 | 1910 | 2040 | effective areas of this fiber profile to conventional fiber profiles, such as taught in U.S. Pat. No. 6,445,864 having effective areas at 1550 nm of between about 15–17 $\mu m^2$, it can be readily seen that the effective area of the present dispersion compensating fiber is much larger. In particular, the effective areas of the dispersion compensating fibers 20 in accordance with the invention are greater than 20 $\mu m^2$ at 1550 nm, and in some embodiments greater than 25 $\mu m^2$ at 1550 nm.

Each of the cutoff wavelengths set forth in Table 1 above satisfy the operating conditions for the systems in which they will be used, namely such that the dispersion compensating fiber is single mode in operation at 1550 nm.

One feature of dispersion compensating fibers 20 made in accordance with the parameters set forth in Tables 1 and 3 is that, in addition to the performance parameters shown therein, the fibers offer excellent system dispersion compensation over a designed wavelength band. In particular, the dispersion compensating performance over the wavelength range (1527–1667 nm) is shown in FIG. 7 and is described with reference to the system shown in FIG. 4 in the following transmission span example.

Figure 4:
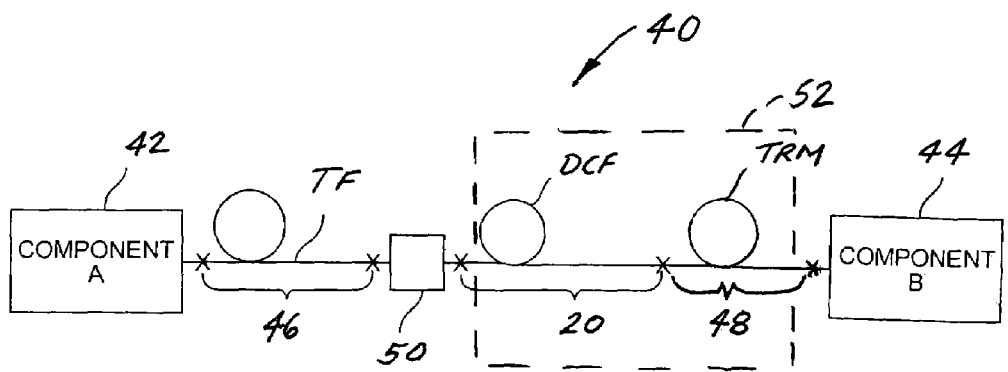
FIG. 4 is a schematic view of an optical fiber span including the dispersion compensating fiber in accordance with the present invention.

As is best shown in FIG. 4, a n optical fiber transmission span 40 is formed using 100 km of transmission optical waveguide fiber 46, having a total dispersion at 1550 nm of between about 3.4 to 5.1 ps/nm/km, an effective area at 1550 nm in the range of 58 to 86 $\mu m^2$, a total dispersion slope at 1550 nm of between about 0.068 to 0.102 ps/nm$^2$/km, and a kappa of about 40 to 70 nm at 1550 nm. The transmission optical fiber 46 is optically coupled to a length of dispersion compensating fiber 20 in accordance with the invention, various embodiments being shown in FIGS. 1, 3, and 8–16 and described in Tables 1 and 3 herein. Preferably also, the span 40 may include a third fiber, such as a trim fiber 48 which is used to further improve the level of compensation over the span 40. The trim fiber 48 is preferably a single mode fiber having a positive dispersion and positive dispersion slope at 1550 nm and preferably exhibiting a total dispersion of between about 12 and 22 ps/nm/km at 1550 nm and a dispersion slope of between about 0.04 and 0.075 ps/nm$^2$/km at 1550 nm. The dispersion compensating fiber 20 and the trim fiber 48 are preferably wound onto spools and packaged as a dispersion compensating module 52.

Referring now to FIG. 7, illustrated is a graph of calculated residual dispersion versus wavelength for different spans including the various embodiments of dispersion compensating fibers 20 is made in accordance with the refractive index profiles of examples 1–8 described in Table 1 above. Each of the spans includes 100 km of transmission fiber as described below. FIG. 7 shows residual dispersion over an operating wavelength range of between about 1527 nm to 1567 nm (the C-band). In particular, the plot illustrates system residual dispersion which is less than about +/−25 ps/nm for a 100 km length of the transmission fiber over the wavelength band from 1527–1567 nm; and more preferably less than +/−20 ps/nm for a 100 km length of the transmission fiber. The transmission fiber 46 utilized in the system is preferably a non-zero dispersion shifted fiber (NZDSF) which exhibits a total dispersion at 1550 nm of between about 3.4 to 5.1 ps/nm/km and a kappa at 1550 nm of between about 40 and 70 nm. The NZDSF preferably has an effective area at 1550 nm in the range from about 58 to 86 $\mu m^2$ at 1550 nm, and a total dispersion slope at 1550 nm of between about 0.068 to 0.102 ps/nm$^2$/km. Table 2 below illustrates the lengths of the various fibers in the span and the modeled residual dispersion for each span over the wavelength range (1527–1567 nm) including the various examples of dispersion compensating fiber in accordance with embodiments of the invention. Some, but not all, of the examples include trim fiber 48.

TABLE 2

Modeled System Dispersion Compensation Performance

| | Example # | | | | | | | |
|---|---|---|---|---|---|---|---|---|
| | 1 | 2 | 3 | 4 | 5 | 6 | 7 | 8 |
| L DCF (km) | 7.20 | 7.06 | 7.25 | 7.24 | 5.24 | 5.39 | 6.47 | 4.98 |
| L Trim (km) | 7.98 | 8.15 | 8.35 | 8.26 | 0.00 | 0.00 | 0.00 | 0.00 |
| L Trans (km) | 100 | 100 | 100 | 100 | 100 | 100 | 100 | 100 |
| Residual Dispersion (ps/nm/km) | +/−15.5 | +/−12.8 | +/−12.7 | +/−12.6 | +/−15.2 | +/−15.3 | +/−17.3 | +/−15.9 |
| Wavelength Range (nm) | 1527–1567 | 1527–1567 | 1527–1567 | 1527–1567 | 1527–1567 | 1527–1567 | 1527–1567 | 1527–1567 |

Figure 6:
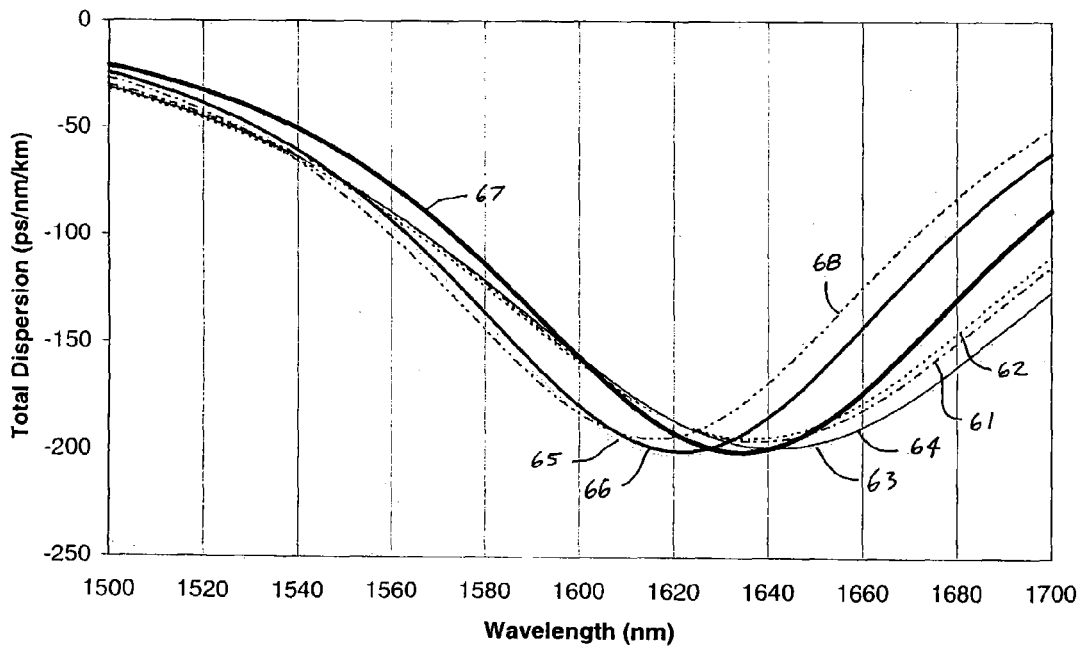
FIG. 6 is a plot of total dispersion vs. wavelength for various embodiments of the dispersion compensating fiber in accordance with the present invention.
Figure 9:
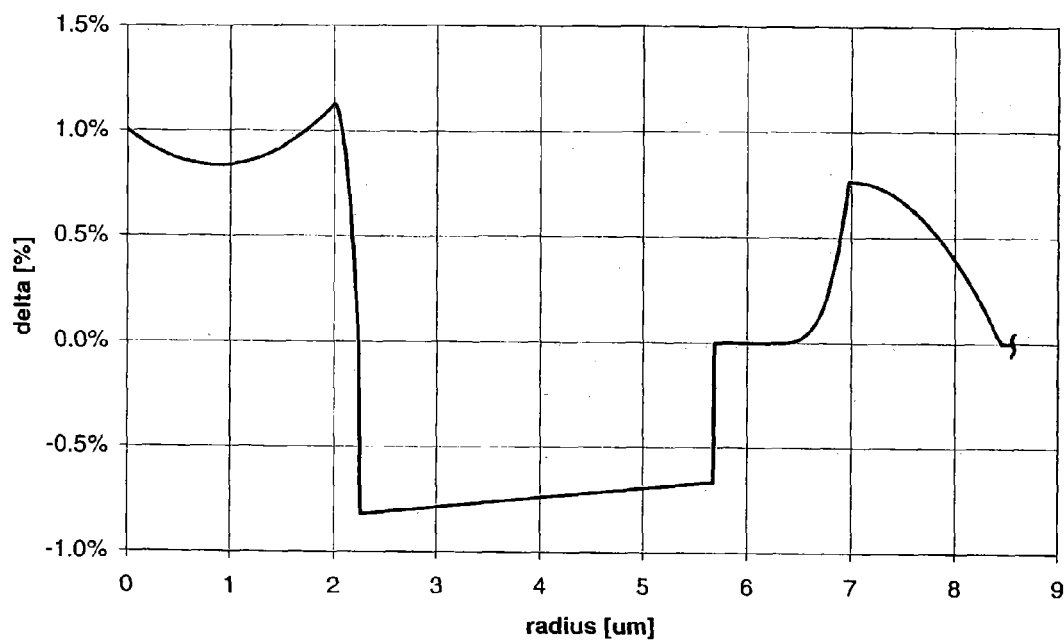
Figure 10:
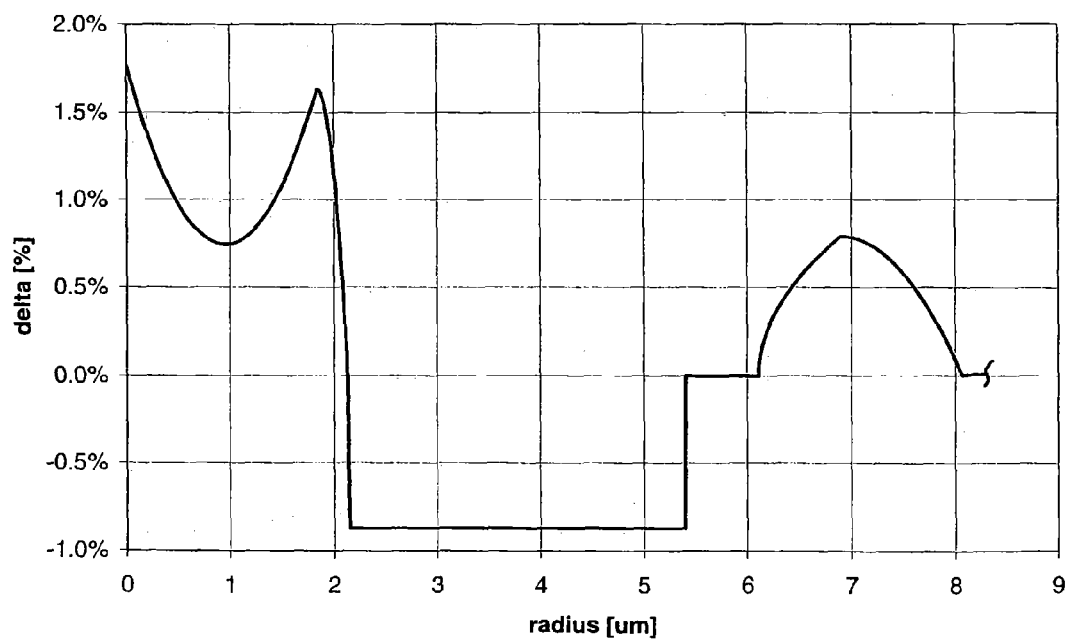
Figure 11:
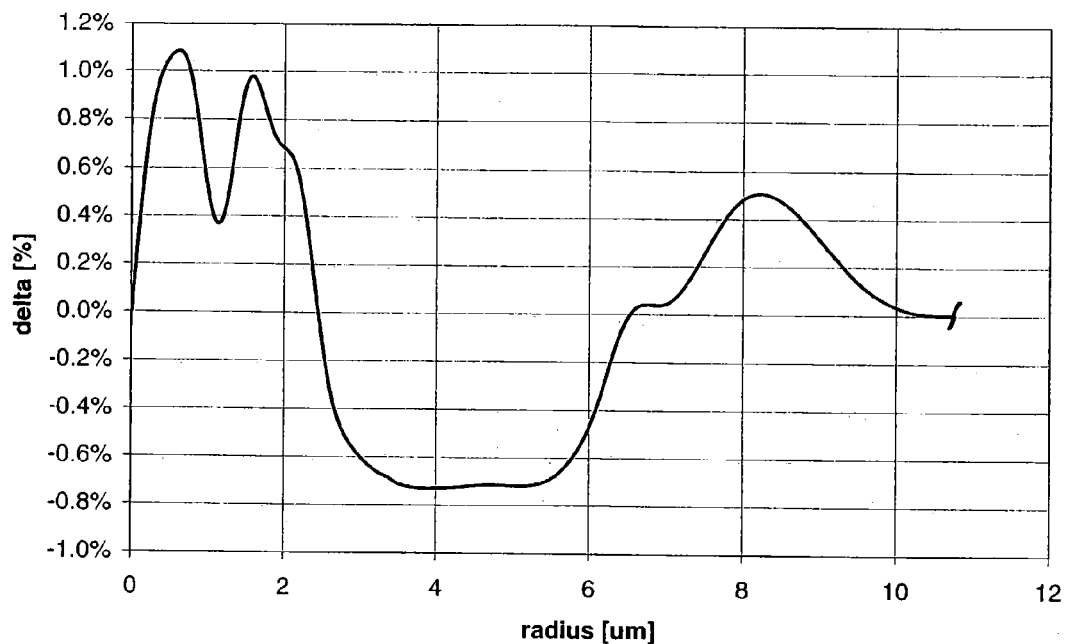
Figure 12:
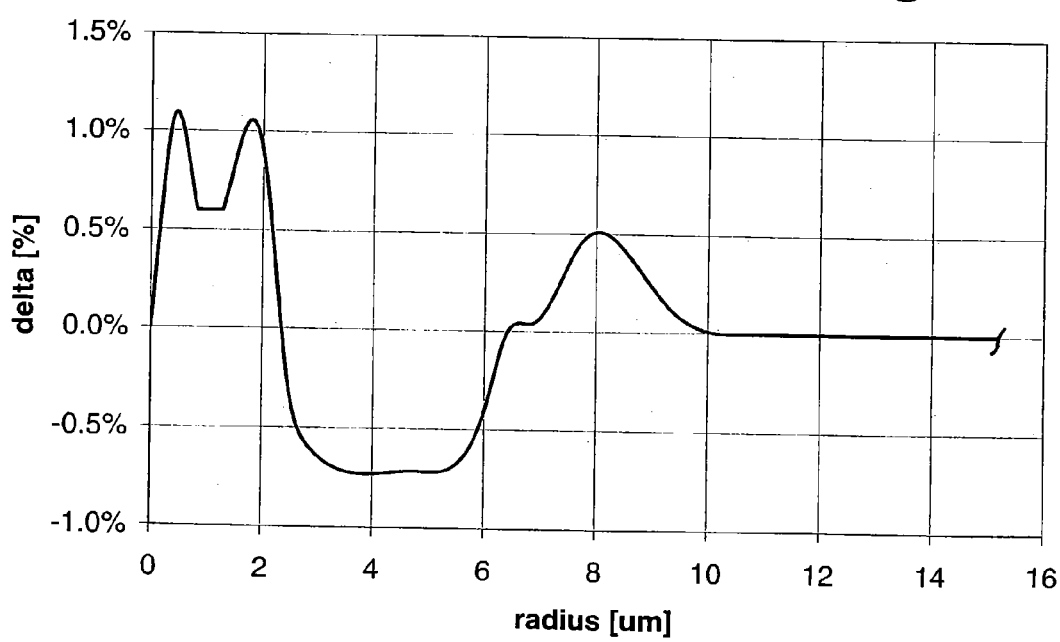
Figure 13:
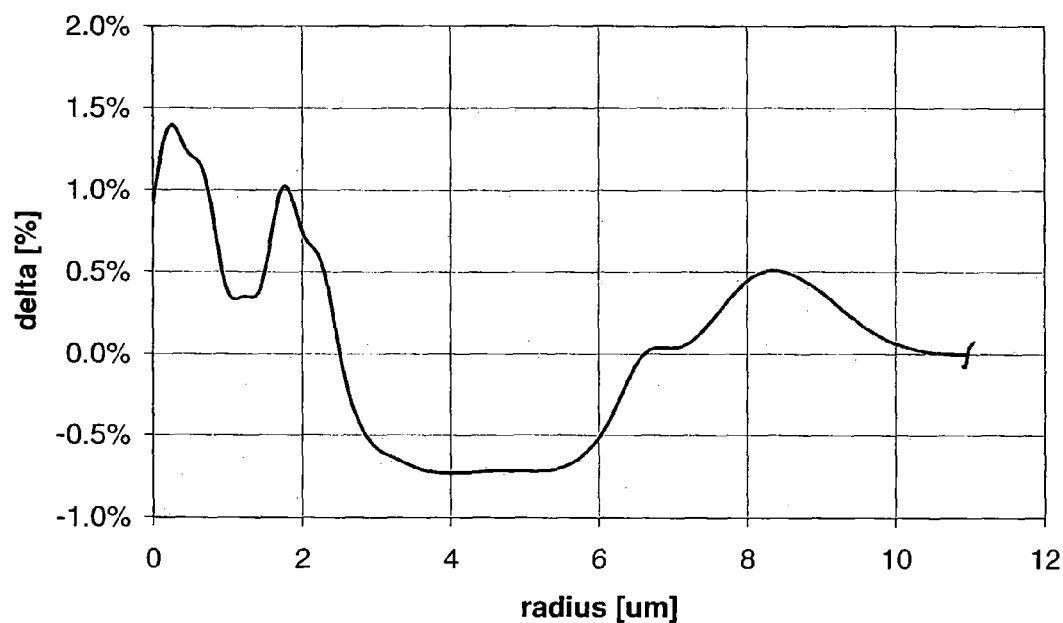

The family of dispersion compensating fibers whose dispersion plots are illustrated in FIG. 6 will provide excellent dispersion compensation for any wavelength division multiplexed (WDM or DWDM) system having channels that extend over a range of at least 1527 nm to 1567 nm. Each of the embodiments of the dispersion compensating fibers 20 provides for substantially equal compensation of channels over the wavelength range of operation. Such compensation over a wide wavelength range serves to enable high data rate, long haul, wavelength division multiplexed telecommunications systems with little signal distortion.

Table 3 below illustrates yet another group of dispersion compensating fibers 20 in accordance with embodiments of the invention. The general structure of the various examples 9–11 are shown in FIGS. 14–16.

TABLE 3

More Dispersion Compensating Fiber Examples

Figure 14:
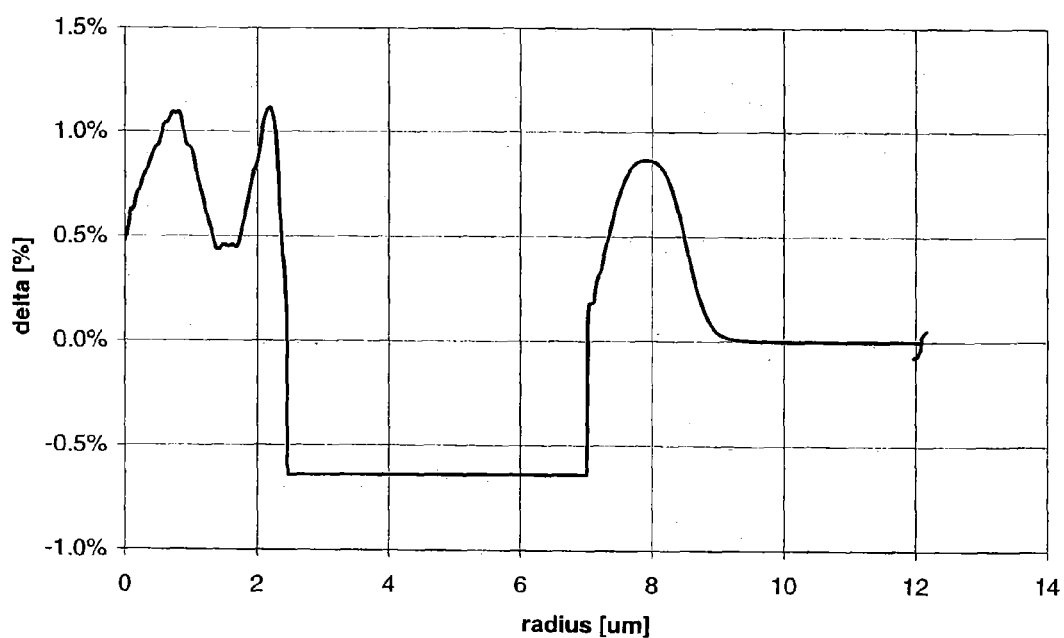
Figure 15:
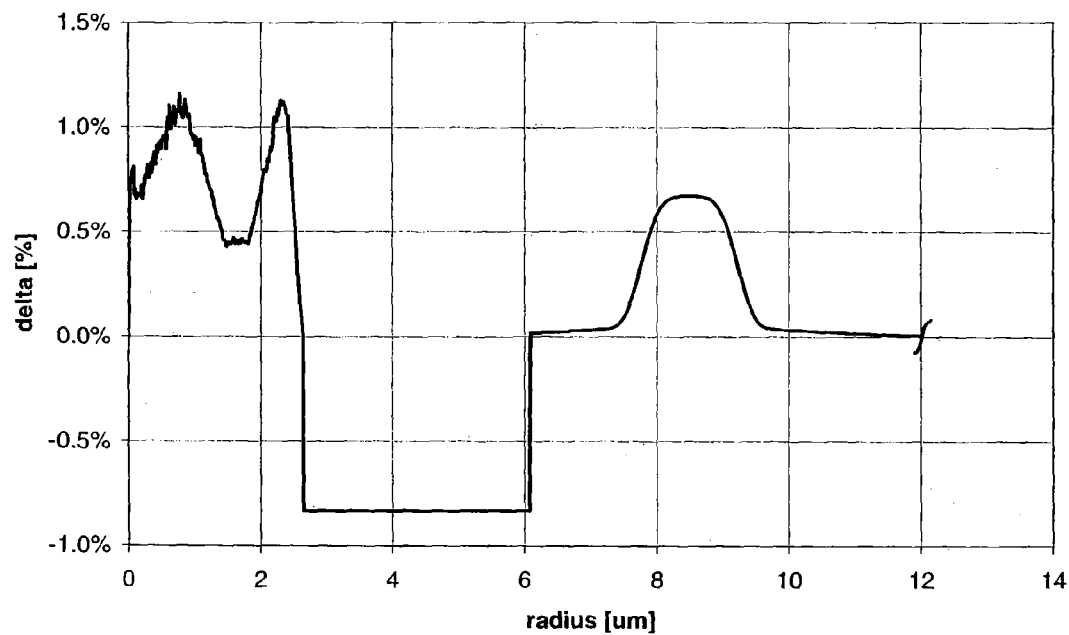
Figure 16:
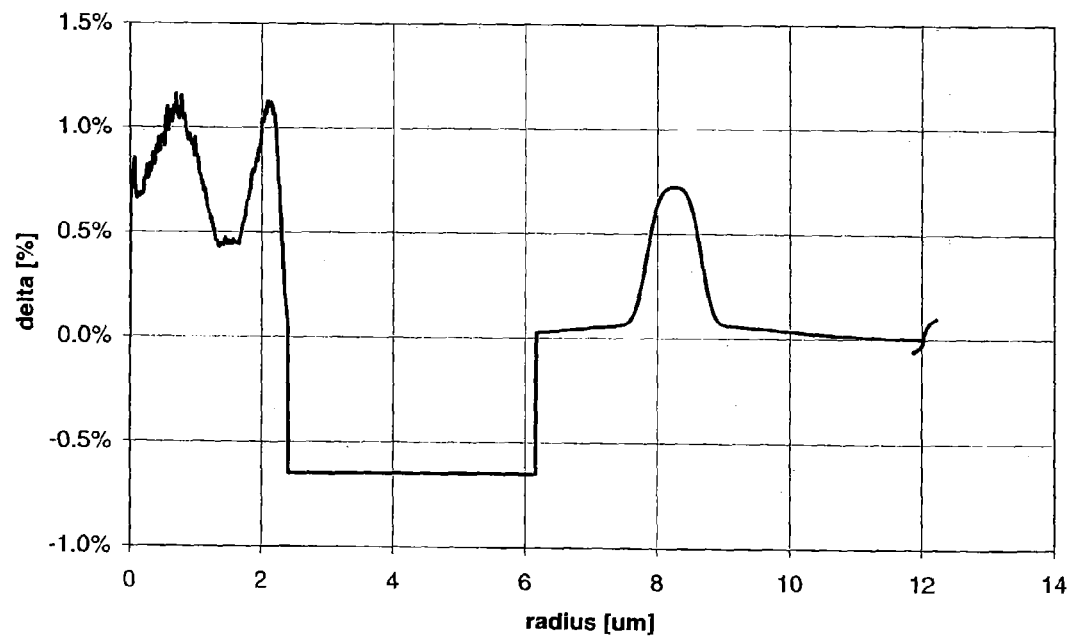

| | Ex. # | | |
|---|---|---|---|
| | Ex. 9 | Ex. 10 | Ex. 11 |
| | FIG. # | | |
| | FIG. 14 | FIG. 15 | FIG. 16 |
| $\Delta_i$ % | 1.09 | 1.09 | 1.09 |
| $\Delta_r$ % | 0.42 | 0.42 | 0.42 |
| $\Delta_1$ % | 1.12 | 1.12 | 1.12 |
| $\Delta_2$ % (Min) | −0.64 | −0.84 | −0.65 |
| $\Delta_3$ % | 0.87 | 0.67 | 0.72 |

TABLE 3-continued

More Dispersion Compensating Fiber Examples

| | Ex. 9 | Ex. 10 | Ex. 11 |
|---|---|---|---|
| | | FIG. # | |
| | FIG. 14 | FIG. 15 | FIG. 16 |
| $r_i$ (μm) | 0.73 | 0.77 | 0.67 |
| $r_t$ (μm) | 1.40 | 1.48 | 1.35 |
| $r_o$ (μm) | 2.19 | 2.30 | 2.13 |
| $r_1$ (μm) | 2.45 | 2.64 | 2.40 |
| $r_2$ (μm) | 7.03 | 6.08 | 6.17 |
| $r_3$ (μm) | 7.92 | 8.73 | 8.25 |
| $W_r$ (μm) | 1.25 | 1.48 | 0.86 |
| Xo (μm) | 0.27 | 1.67 | 1.65 |
| Dispersion (ps/nm/km) @ 1550 nm | −60.0 | −93.3 | −94.7 |
| Dispersion Slope (ps/nm²/km) @ 1550 nm | −1.22 | −2.34 | −2.00 |
| Kappa (nm) @ 1550 nm | 49.3 | 39.8 | 47.3 |
| Dispersion Minimum Location (nm) | 1632 | 1606 | 1614 |
| Dispersion Minimum (ps/nm/km) | −174.8 | −218.4 | −226.0 |
| Aeff (μm²) @ 1550 nm | 26.5 | 27.9 | 27.3 |
| MFD (μm) @ 1550 nm | 5.56 | 5.56 | 5.62 |
| Pin Array (dB) @ 1550 nm | 63.2 | 19.86 | 145 |
| Lateral Load Bend Loss (dB) @ 1550 nm | 0.09 | 0.15 | 0.14 |
| Cutoff (nm) Straight Fiber | 1908 | 2262 | 1842 |

As should be recognized, any of the dispersion compensating fibers 20 described herein may be employed in a fiber link or span that, in turn, is used in a telecommunications system, such as, for example, a multi-channel WDM or DWDM system. The dispersion compensating fibers 20 disclosed herein may be employed in a cabled link or in a dispersion compensating module 52 as described above.

In a preferred embodiment, the dispersion compensating fibers 20 described herein are employed in a fiber span 40 together with a transmission fiber 46 which is a non-zero dispersion shifted fiber (NZDSF) type fiber which exhibits a total dispersion at 1550 nm of between about 3.4 to 5.1 ps/nm/km, an effective area at 1550 nm in the range from about 58 to 86 μm² at 1550 nm, a total dispersion slope at 1550 nm of between about 0.068 to 0.102 ps/nm²/km, and a kappa at 1550 nm of between about 40 and 70 nm. In one particularly preferred embodiment, the fiber span is located between a pair of erbium doped fiber amplifiers comprising component (A) 42 and component (B) 44 with one end of the large effective area, positive dispersion fiber 46 located at the amplifier output side and the other optically coupled to the dispersion compensating fiber 20 of the present invention. Having the large effective area fiber disposed at the location of highest optical power minimizes nonlinear effects such as cross phase modulation and four wave mixing.

In another embodiment, the fiber span is located between a pair of hybrid amplifiers which are capable of erbium doped fiber amplification in the forward propagating direction and Raman amplification in the backward propagating direction. The span which is disposed between the two amplifiers in this embodiment (not shown) includes a length of the dispersion compensating fiber of the present invention located between two lengths of the large effective area, positive dispersion fiber. Having the large effective area fiber disposed at both ends of the fiber span facilitates both transmission of the signal which is amplified by the erbium doped fiber amplifier, and Raman pumping of the signal by the Raman pump amplifier. Preferably, the two lengths of positive dispersion fiber employed in the span are of relatively equal length.

Figure 5:
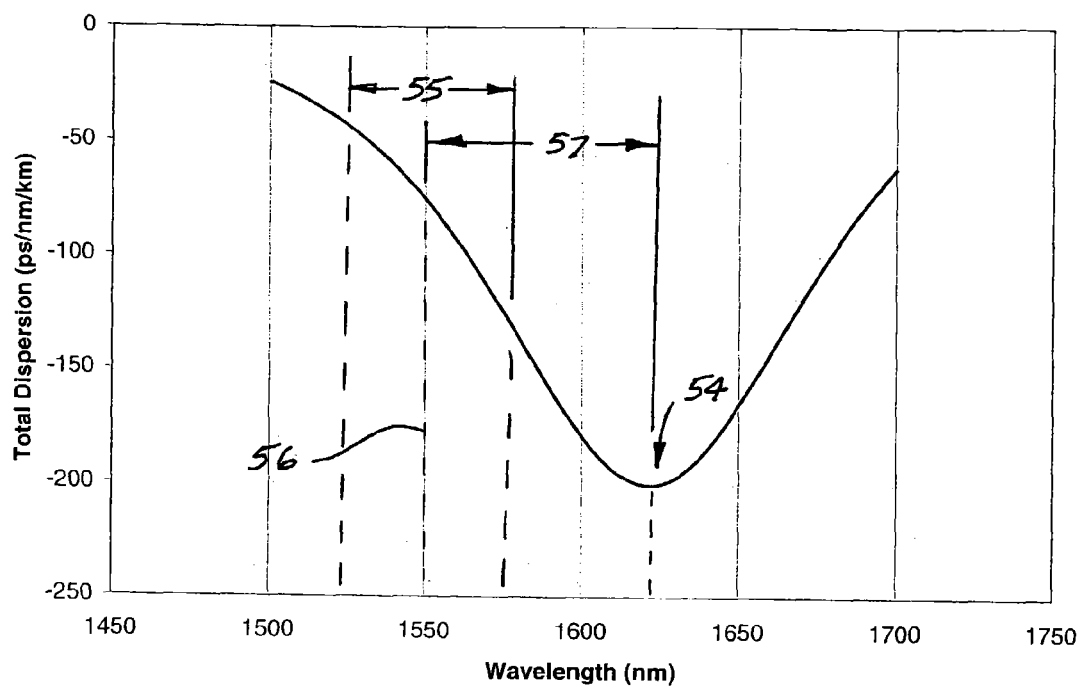
FIG. 5 is a plot of total dispersion vs. wavelength of an embodiment of the dispersion compensating fiber in accordance with the present invention illustrating the location of the dispersion minima.

FIG. 5 is shown herein to describe the dispersion minima 54 in the dispersion plot and its location relative to the operating wavelength band 55 and center wavelength 56. It should be recognized that the definitions relative to FIG. 5 are equally applicable to the embodiments of dispersion compensating fiber 20 shown in FIG. 6 and such definitions have been omitted therein for the sake of clarity. As shown in FIG. 5, the total dispersion of the dispersion compensating fiber 20 (Example 6) is plotted versus wavelength (between about 1500 and 1700 nm). As should be recognized, each curve exhibits a dispersion minima 54, that is, a point as a function of wavelength having the lowest total dispersion. In operation, the dispersion compensating fiber 20 is deployed and operated with an operating wavelength band 55 having a center wavelength 56.

According to further embodiments of the invention (Described in FIGS. 5 and 6), the dispersion compensating fibers 20 are designed such that the minima 54 is preferably positioned and located at a wavelength interval 57 that is at least 55 nm above the center 56 of the operating wavelength band 55. FIG. 5 illustrates this spacing of the minima 54 from the center operating wavelength 56. However, it should be recognized that all of the dispersion compensating fibers 20 described herein preferably exhibit this property (examples 1–11). For the sake of clarity, in the example shown, 1550 nm is the center operating wavelength 56 and the operating wavelength band 55 is the C-band (from 1527–1567 nm). Thus, by way of example, a desirably designed dispersion compensating fiber 20 in accordance with embodiments the invention will preferably have a minima 54 located at a wavelength of at least 1605 nm or higher. The plots illustrated in FIG. 6 show various positions of the minima 54. Accordingly, it should be recognized that by changing various fiber parameters, the position thereof may be adjusted. In particular, the plots numbers and their corresponding examples are shown in Table 1.

It should be understood that the spans disclosed and described herein may be used in optical connection with one another to form a telecommunications link or span, which preferably includes a transmitter and receiver and typically can incorporate a variety of other conventional components such as optical amplifiers, couplers, pump lasers, wavelength division multiplexing devices, and electro-optical regenerators.

The dispersion compensating fibers in accordance with the invention may be produced by any known method, such as OVD, MCVD, PCVD or combinations thereof. The profile of the central core segment 22 is preferably manufactured by varying the amount of germania dopant as a function of preform radius by an OVD method. The moat segment is preferably formed by depositing silica-containing soot on a germania doped core cane and then solution doping the preform with fluorine by exposing the preform at a suitable temperature to a $SiF_4$, $CF_4$ or other like fluorine-containing compound.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A dispersion compensating fiber, comprising:
a refractive index profile having
a central core segment with
an inner peak having a relative refractive index $\Delta_i\%$ located at a radius $r_i$ of between 0.0 $\mu$m and 1.0 $\mu$m,
an outer peak with a relative refractive index $\Delta_1\%$ located at a radius $r_o$ between 1.5 $\mu$m and 2.5 $\mu$m, and
a trough positioned between the inner peak and outer peak having a minimum relative refractive index $\Delta_t\%$ less than both $\Delta_i\%$ and $\Delta_1\%$, wherein the minimum relative refractive index $\Delta_t\%$ is between 0.3% to 1.0%,
a moat segment, surrounding the central core segment, having a relative refractive index $\Delta_2\%$, and
a ring segment, surrounding the moat segment, having a positive relative refractive index $\Delta_3\%$ wherein $\Delta_t\%$ and $\Delta_3\%$ are greater than $\Delta_2\%$ wherein the dispersion compensating fiber exhibits negative dispersion at 1550 nm.

2. The dispersion compensating fiber of claim 1 having a total dispersion at 1550 nm of between −50 and −100 ps/nm/km.

3. The dispersion compensating fiber of claim 1 having a kappa, defined as a ratio of total dispersion at 1550 nm divided by total dispersion slope at 1550 nm, of less than 100 nm.

4. The dispersion compensating fiber of claim 3 having a total dispersion slope at 1550 nm of −1.0 to −2.5 ps/nm²/km.

5. The dispersion compensating fiber of claim 1 having an effective area at 1550 nm of greater than 20 $\mu$m².

6. The dispersion compensating fiber of claim 5 having an effective area at 1550 nm of greater than 25 $\mu$m².

7. The dispersion compensating fiber of claim 1 wherein the inner peak index $\Delta_1\%$ is between 0.5% to 2.0%.

8. The dispersion compensating fiber of claim 1 wherein the inner peak is located at a radius $r_i$ of between 0.0 $\mu$m and 0.85 $\mu$m.

9. The dispersion compensating fiber of claim 1 wherein the outer peak index $\Delta_1\%$ is between 0.9% to 2.0%.

10. The dispersion compensating fiber of claim 1 wherein the outer peak is located at a radius $r_o$ between 1.4 $\mu$m and 2.4 $\mu$m.

11. An optical fiber span, comprising:
a transmission fiber operating in a wavelength band having a center operating wavelength, and
the dispersion compensating fiber of claim 1 optically coupled to the transmission fiber, wherein a dispersion minima of the dispersion compensating fiber is positioned at least 55 nm above the center operating wavelength.

12. An optical fiber span, comprising:
a transmission fiber operating in a wavelength band having a center operating wavelength, and
the dispersion compensating fiber of claim 1 optically coupled to the transmission fiber, wherein a residual dispersion of the span is less than +/−25 ps/nm per 100 km of the transmission fiber over a wavelength band of between about 1527 to 1567 nm.

13. A dispersion compensating module comprising the dispersion compensating fiber of claim 1.

14. The dispersion compensating fiber of claim 1 having a kappa, defined as a ratio of total dispersion to total dispersion slope at 1550 nm, of between 35 nm to 65 nm.

15. The dispersion compensating fiber of claim 1 wherein $\Delta_2\%$ is less than −0.5%.

16. The dispersion compensating fiber of claim 1 wherein the relative refractive index $\Delta_3\%$ of the ring segment is greater than 0.4%.

17. The dispersion compensating fiber of claim 16 wherein $\Delta_3\%$ is between 0.5% to 1.0%.

18. A dispersion compensating fiber, comprising:
a refractive index profile having
a central core segment with
an inner peak with a relative refractive index $\Delta_i\%$ in the range from 0.7% to 2.0% located at a radius $r_i$ of between 0.0 $\mu$m and 1.0 $\mu$m,
an outer peak with a relative refractive index $\Delta_1\%$ in the range from 0.7% to 2.0% located at a radius $r_o$ between 1.5 $\mu$m and 2.5 $\mu$m, and
a trough positioned between the inner peak and the outer peak having a minimum trough index $\Delta_t\%$ in the range from 0.3% to 1.0% wherein $\Delta_t\%$ is less than both $\Delta_i\%$ and $\Delta_1\%$,
a moat segment, surrounding the central core segment, having a negative relative refractive index $\Delta_2\%$ more negative than −0.5%, and
a ring segment, surrounding the moat segment, having a relative refractive index $\Delta_3\%$ greater than 0.4%.

19. A dispersion compensating fiber, comprising:
a refractive index profile having
a central core segment with
an inner peak with a relative refractive index $\Delta_i\%$ in the range from 0.5% to 2.0% located at a radius $r_i$ of between 0.0 $\mu$m and 0.85 $\mu$m,
an outer peak with a relative refractive index $\Delta_1\%$ in the range from 0.9% to 2.0% located at a radius $r_o$ between 1.5 $\mu$m and 2.5 $\mu$m, and
a trough positioned between the inner peak and the outer peak having a minimum trough index $\Delta_t\%$ in the range from 0.3% to 1.0% wherein $\Delta_t\%$ is less than both $\Delta_i\%$ and $\Delta_1\%$,
a moat segment, surrounding the central core segment, having a negative relative refractive index $\Delta_2\%$ between about −0.5 to −1.0%, and
a ring segment, surrounding the moat segment, having a relative refractive index $\Delta_3\%$ of between about 0.5 to 1.0%.

* * * * *